United States Patent
Karnjate et al.

(10) Patent No.: US 8,392,088 B2
(45) Date of Patent: Mar. 5, 2013

(54) BRAKE ASSIST DRIVER COMMAND FOR VEHICLES

(75) Inventors: Timothy M. Karnjate, Grand Blanc, MI (US); William K. Manosh, Lancaster, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1073 days.

(21) Appl. No.: 11/872,733

(22) Filed: Oct. 16, 2007

(65) Prior Publication Data

US 2009/0099745 A1    Apr. 16, 2009

(51) Int. Cl.
*G06F 17/00* (2006.01)
*B60T 7/00* (2006.01)
*B60T 7/12* (2006.01)

(52) U.S. Cl. .................................. 701/78; 303/113.4
(58) Field of Classification Search ................ 701/1, 36, 701/45, 48, 49, 70, 83, 78, 91, 93, 96, 301; 303/121, 113.1, 113.3, 113.4; 188/DIG. 1
See application file for complete search history.

(56) References Cited

U.S. PATENT DOCUMENTS

| | | | |
|---|---|---|---|
| 5,230,549 A | | 7/1993 | Osada et al. |
| 5,779,329 A | | 7/1998 | Takeshima |
| 5,816,667 A | * | 10/1998 | Jokic ........................ 303/113.4 |
| 5,853,230 A | * | 12/1998 | Wagner et al. ............. 303/113.4 |
| 5,931,545 A | * | 8/1999 | Yonemura et al. ............ 303/125 |
| 5,962,997 A | | 10/1999 | Maisch |
| 5,967,628 A | | 10/1999 | Abe et al. |
| 6,021,365 A | | 2/2000 | Ishii et al. |
| 6,024,420 A | * | 2/2000 | Yonemura et al. ......... 303/113.2 |
| 6,099,086 A | | 8/2000 | Feigel et al. |
| 6,105,737 A | | 8/2000 | Weigert et al. |
| 6,109,703 A | * | 8/2000 | Takahashi ..................... 303/155 |
| 6,142,581 A | | 11/2000 | Yamaguchi et al. |
| 6,212,459 B1 | | 4/2001 | Unterforsthuber |
| 6,386,646 B1 | | 5/2002 | Hinz et al. |
| 6,457,785 B1 | * | 10/2002 | Yonemura et al. ............ 303/182 |
| 6,473,681 B1 | | 10/2002 | Eckert et al. |

(Continued)

FOREIGN PATENT DOCUMENTS

DE    19712859 A1    10/1998
DE    10124591 A1    1/2002

(Continued)

OTHER PUBLICATIONS

Office Action issued on Feb. 25, 2010, for German Patent Application No. 102008051451, filed Oct. 13, 2008.

(Continued)

*Primary Examiner* — Thomas Tarcza
*Assistant Examiner* — Edward Pipala
(74) *Attorney, Agent, or Firm* — Ingrassia Fisher & Lorenz, P.C.

(57) ABSTRACT

A method for controlling a braking system in a vehicle during a panic braking event includes the steps of determining a magnitude of force applied to the brake pedal, determining a first level of braking that would result from the magnitude of force applied to the brake pedal if there were no panic braking event, and applying a second level of braking equal to the lesser of the following: the maximum braking capacity, and the level of braking that would result from the magnitude of force applied to the brake pedal if there were no panic braking event, multiplied by a predetermined constant.

20 Claims, 3 Drawing Sheets

U.S. PATENT DOCUMENTS

| | | |
|---|---|---|
| 6,474,751 B1 | 11/2002 | Yamaguchi et al. |
| 6,476,515 B1 | 11/2002 | Yamamoto et al. |
| 6,637,839 B1 | 10/2003 | Fuchs et al. |
| 7,117,072 B2 | 10/2006 | Gehring et al. |
| 7,630,807 B2 | 12/2009 | Yoshimura et al. |
| 7,634,345 B2 | 12/2009 | Karnjate et al. |
| 7,826,952 B2 | 11/2010 | Disser et al. |
| 2001/0005805 A1 | 6/2001 | Saotome et al. |
| 2002/0163247 A1 | 11/2002 | Yonemura et al. |
| 2003/0031578 A1 | 2/2003 | Uchiyama et al. |
| 2005/0046272 A1 | 3/2005 | Rieth et al. |
| 2006/0220826 A1 | 10/2006 | Rast |
| 2006/0287797 A1 | 12/2006 | Haller et al. |
| 2008/0234907 A1 | 9/2008 | Labuhn et al. |
| 2009/0082935 A1 | 3/2009 | Leschuk et al. |
| 2009/0099744 A1 | 4/2009 | Karnjate et al. |
| 2009/0099745 A1 | 4/2009 | Karnjate et al. |
| 2009/0105919 A1 | 4/2009 | Karnjate et al. |
| 2010/0030421 A1 | 2/2010 | Yoshimura et al. |

FOREIGN PATENT DOCUMENTS

| | | |
|---|---|---|
| DE | 10118635 A1 | 5/2002 |
| DE | 102005021497 A1 | 11/2006 |
| DE | 102006013051 A1 | 9/2007 |
| WO | 0010852 A1 | 3/2000 |
| WO | 03022648 A1 | 3/2003 |
| WO | 2004085220 A1 | 10/2004 |

OTHER PUBLICATIONS

Office Action issued on Mar. 4, 2010, for German Patent Application No. 102008051452.

Office Action issued on May 11, 2010, for German Patent Application No. 102008051535.

U.S. Office Action for U.S. Appl. No. 11/873,450 mailed Jan. 5, 2011.

U.S. Office Action for U.S. Appl. No. 11/872,730 mailed Jan. 6, 2011.

U.S. Final Office Action for U.S. Appl. No. 11/873,450 mailed Apr. 18, 2011.

U.S. Final Office Action for U.S. Appl. No. 11/872,730 mailed Jun. 22, 2011.

United States Patent and Trademark Office, U.S. Office Action dated Mar. 19, 2012 for U.S. Appl. No. 11/872,730.

* cited by examiner

BRAKE ASSIST DRIVER COMMAND FOR VEHICLES

TECHNICAL FIELD

The present invention generally relates to the field of braking systems for vehicles and, more specifically, to a method and system for commanding braking during a panic braking event.

BACKGROUND OF THE INVENTION

To enhance an operator's driving experience and a vehicle's performance and safety, various electronic enhancements and systems assist or replicate automotive systems that were previously mechanical in nature. One such automotive system is the brake-by-wire system. In a brake-by-wire system, an operator's activation of the brake pedal is determined by one or more sensors. Data from the sensors is then used by a computer or processor to determine an appropriate braking force to apply to the brakes.

Several different types of brake-by-wire systems exist. For example, in an electro-hydraulic braking system, the computer commands an electro-hydraulic actuator to apply hydraulic pressure to the brake calipers to stop the vehicle. In contrast, in an electromechanical braking system, the braking force is applied instead by an electronic caliper which utilizes a small motor to push the brake pads against the rotor to stop the vehicle. Additionally, vehicles can incorporate combined systems such as electro-mechanical and electro-hydraulic systems. Also, hybrid cars can utilize a combination of friction braking, which can be electromechanical or electro-hydraulic, and regenerative braking, which is also a type of electronic braking in which speed is reduced by converting kinetic energy into electrical energy.

Regardless of the particular type of braking system, an important feature of many braking systems is the ability to be appropriately commanded during panic braking situations. In a panic braking situation, the vehicle operator typically applies force to the brake pedal at a very rapid rate, but not necessarily with a large enough force to decelerate the vehicle fast enough, based on the force alone. A braking control system can apply an appropriate level of braking during such a panic braking event, for example using a panic braking command algorithm. However, panic braking algorithms and systems that provide the driver of the vehicle with an optimal level of control of braking during a panic braking event, and/or do not require a lag time before applying an appropriate increased level of braking, are needed. In the future new government regulations may impose specific requirements for panic braking algorithms and systems. For example, new proposed regulations in the European Community would require that panic braking assist algorithms and systems provide braking torque that is at least double the braking torque that would ordinarily be represented by the driver's brake request during a panic braking event. Accordingly, panic braking algorithms and systems that will meet future governmental regulations also are needed.

Accordingly, it is desirable to provide an improved method and system for controlling braking during a panic braking event that provides the driver with more braking control during the panic braking event. It is also desirable to provide a method and system for controlling braking during a panic braking event that decreases or eliminates lag time before applying an increased level of braking. In addition, it is desirable to provide a method and system for controlling braking during a panic braking event that more easily meets future governmental regulations. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method is provided for controlling a braking system in a vehicle during a panic braking event, the braking system having a brake pedal and a maximum braking capacity. The method comprises the steps of determining a magnitude of force applied to the brake pedal, determining a first level of braking that would result from the magnitude of force applied to the brake pedal if there were no panic braking event, and applying a second level of braking equal to the lesser of the following: the maximum braking capacity, and the first level of braking, multiplied by a predetermined constant.

In accordance with another exemplary embodiment of the present invention, a control system for controlling a braking system in a vehicle during a panic braking event is provided. The control system comprises a sensor and a processor. The sensor is configured to at least facilitate measuring a force applied to the brake pedal. The processor is configured to at least facilitate determining a first level of braking that would result from the force applied to the brake pedal if there were no panic braking event, and applying a second level of braking equal to the lesser of the following: the maximum braking capacity, and the first level of braking, multiplied by a predetermined constant.

In accordance with a further exemplary embodiment of the present invention, a braking system for a vehicle having a maximum braking capacity is provided. The braking system comprises a brake pedal, a brake pedal force sensor, a plurality of brake units, and a brake controller for controlling the plurality of brake units in the vehicle during a panic braking event. The brake pedal force sensor is configured to generate force data indicative of a magnitude of force applied to the brake pedal. The plurality of brake units are configured to slow or stop the vehicle. The brake controller is configured to at least facilitate determining a first level of braking that would result from the magnitude of force applied to the brake pedal if there were no panic braking event, and applying the plurality of brake units with a second level of braking equal to the lesser of the following: the maximum braking capacity, and the first level of braking, multiplied by a predetermined constant.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
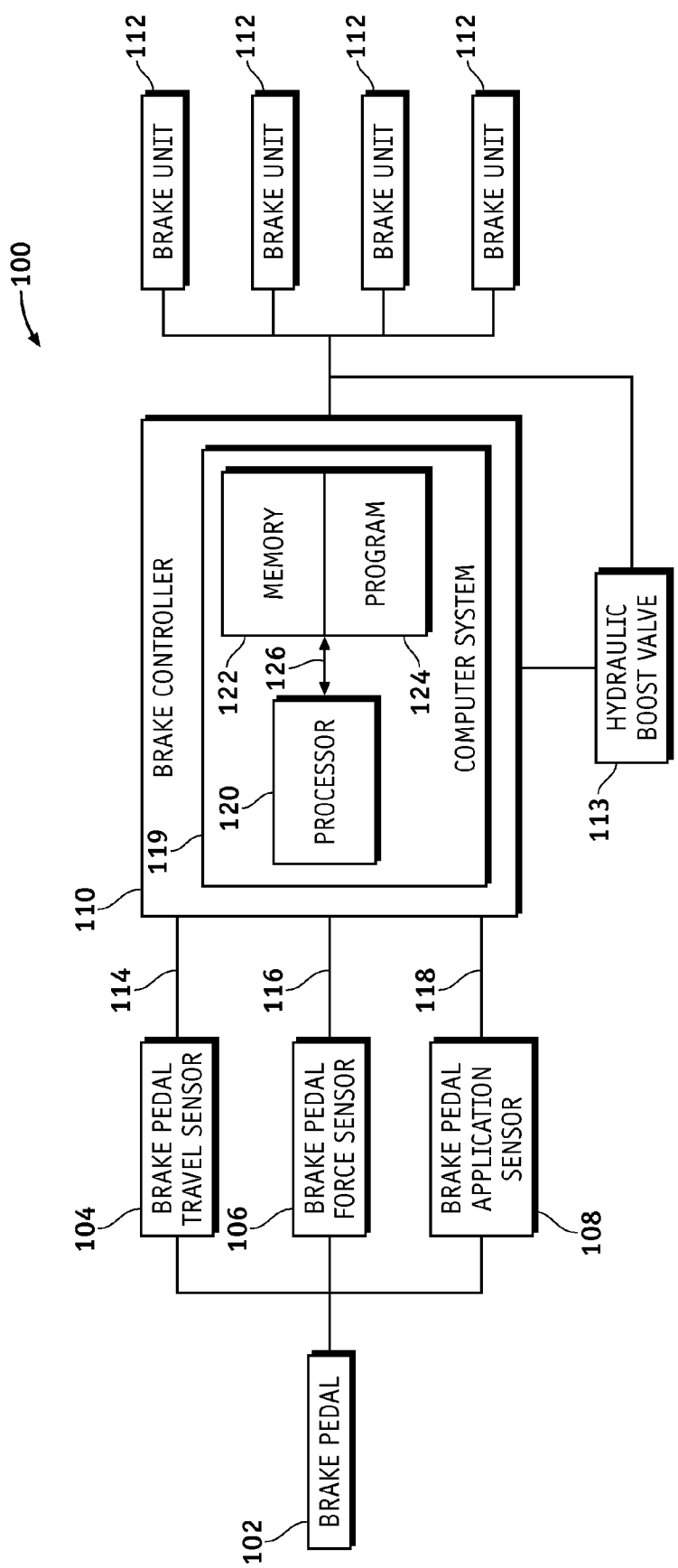
FIG. 1 is a block diagram of an exemplary vehicle braking system that can be used in a panic braking event.

FIG. 1 is a block diagram of an exemplary braking system 100 for use in a brake-by-wire system. The braking system 100 includes a brake pedal 102, a brake pedal travel sensor 104, a brake pedal force sensor 106, a brake pedal application sensor 108, a brake controller 110, and a plurality of brake units 112. The braking system 100 may also include a hydraulic boost valve 113. The brake pedal 102 provides an interface between an operator of a vehicle and a brake system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system.

The brake pedal travel sensor 104, the brake pedal force sensor 106, and the brake pedal application sensor 108 are coupled to the brake pedal 102. The brake pedal travel sensor 104 provides an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved. Other methods of measuring brake travel can also be utilized. Regardless of the particular method utilized, the brake pedal travel sensor 104 collects brake pedal travel data for ultimate use by the brake controller 110 in determining an appropriate level of braking during a panic braking event, as described further below.

The brake pedal force sensor 106 determines how much force the operator of braking system 100 is applying to the brake pedal 102. This is also known as brake pedal force. In one exemplary embodiment, the brake pedal force sensor 106 may include a hydraulic pressure emulator and/or a pressure transducer, and the brake pedal force can be determined by measuring hydraulic pressure in a master cylinder of the braking system 100. Other methods of determining the amount of brake pedal force can also be used. Regardless of the particular method utilized, the brake pedal force sensor 106 collects brake pedal force data for ultimate use by the brake controller 110 in determining an appropriate level of braking during a panic braking event, as described further below.

The brake pedal application sensor 108 senses whether an operator is currently applying force to the brake pedal 102, for example by sensing when an operator's foot is in contact with the brake pedal 102. In one exemplary embodiment, the brake pedal application sensor 108 activates a brake light activation switch when the vehicle operator is currently applying force to the brake pedal 102, although it will be appreciated that other types of brake pedal application sensors 108 may also be used. Regardless of the particular type used, the brake pedal application sensor 108 collects brake activation data to further assist the brake controller 110 in determining an appropriate level of braking during a panic braking event, as also described further below.

The brake controller 110 is coupled to the brake pedal travel sensor 104, the brake pedal force sensor 106, and the brake pedal application sensor 108, as well as to the brake units 112. The brake controller 110 receives a first input 114 from the brake pedal travel sensor 104, namely brake pedal travel data, a second input 116 from the brake pedal force sensor 106, namely brake pedal force data, and a third input 118 from the brake pedal application sensor 108, namely brake pedal application data. As described in more detail below, the brake controller 110 uses values from the first, second, and third inputs 114, 116, and 118 to perform various calculations, comparisons, and determinations, such as those described further below in connection with FIG. 2. The brake controller 110 uses such calculations, comparisons, and determinations in ultimately controlling the level of braking during a panic braking event with appropriate braking commands sent to the brake units 112, based on the calculations, comparisons, and determinations.

In the depicted embodiment, the brake controller 110 includes a computer system 119 that includes a processor 120, a memory 122, and a bus 126. The processor 120 performs the computation and control functions of the brake controller 110, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 124 contained within the memory 122 and, as such, controls the general operation of the computer system 119. The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 126 serves to transmit programs, data, status and other information or signals between the various components of the computer system 119. The bus 126 can be any suitable physical or logical means of connecting computer systems and components. This includes, but is not limited to, direct hard-wired connections, fiber optics, infrared and wireless bus technologies. During operation, the program 124 is stored in the memory 122 and executed by the processor 120. It will be appreciated that the brake controller 110 may differ from the embodiment depicted in FIG. 1, for example in that the brake controller 110 may be coupled to or may otherwise utilize one or more remote computer systems and/or other control systems.

The brake units 112 receive the brake commands from the brake controller 110, and are controlled thereby accordingly. The brake units 112 can include any number of different types of devices that, upon receipt of brake commands, can apply the proper braking torque as received from the brake controller 110. For example, in an electro-hydraulic system, the brake units 112 can comprise an actuator that can generate hydraulic pressure that can cause brake calipers to be applied to a brake disk to induce friction to stop a vehicle. Alternatively, in an electromechanical brake-by-wire system, the brake units 112 can comprise a wheel torque-generating device that operates as a vehicle brake. The brake units 112 can also be regenerative braking devices, in which case the brake units 112, when applied, at least facilitate conversion of kinetic energy into electrical energy As mentioned above, in certain embodiments, such as the exemplary electro-hydraulic braking system depicted in FIG. 1, the braking system 100 may also include a hydraulic boost valve 113. The hydraulic boost valve 113 is coupled to the brake controller 100 and the brake units 112, and at least facilitates the application of a maximum braking force of the braking system 100 when appropriate, as determined by the brake controller 110. For example, as discussed further below, during an initial predetermined amount of time following the detection of a panic braking event, the brake controller 110 may activate the hydraulic boost valve 113, which thereby generates maximum pressure in applying the brake units 112. In other embodiments, any number of other different devices may be used, instead of or in addition to the hydraulic boost valve 113, to generate the maximum pressure in applying the brake units 112.

Figure 2:
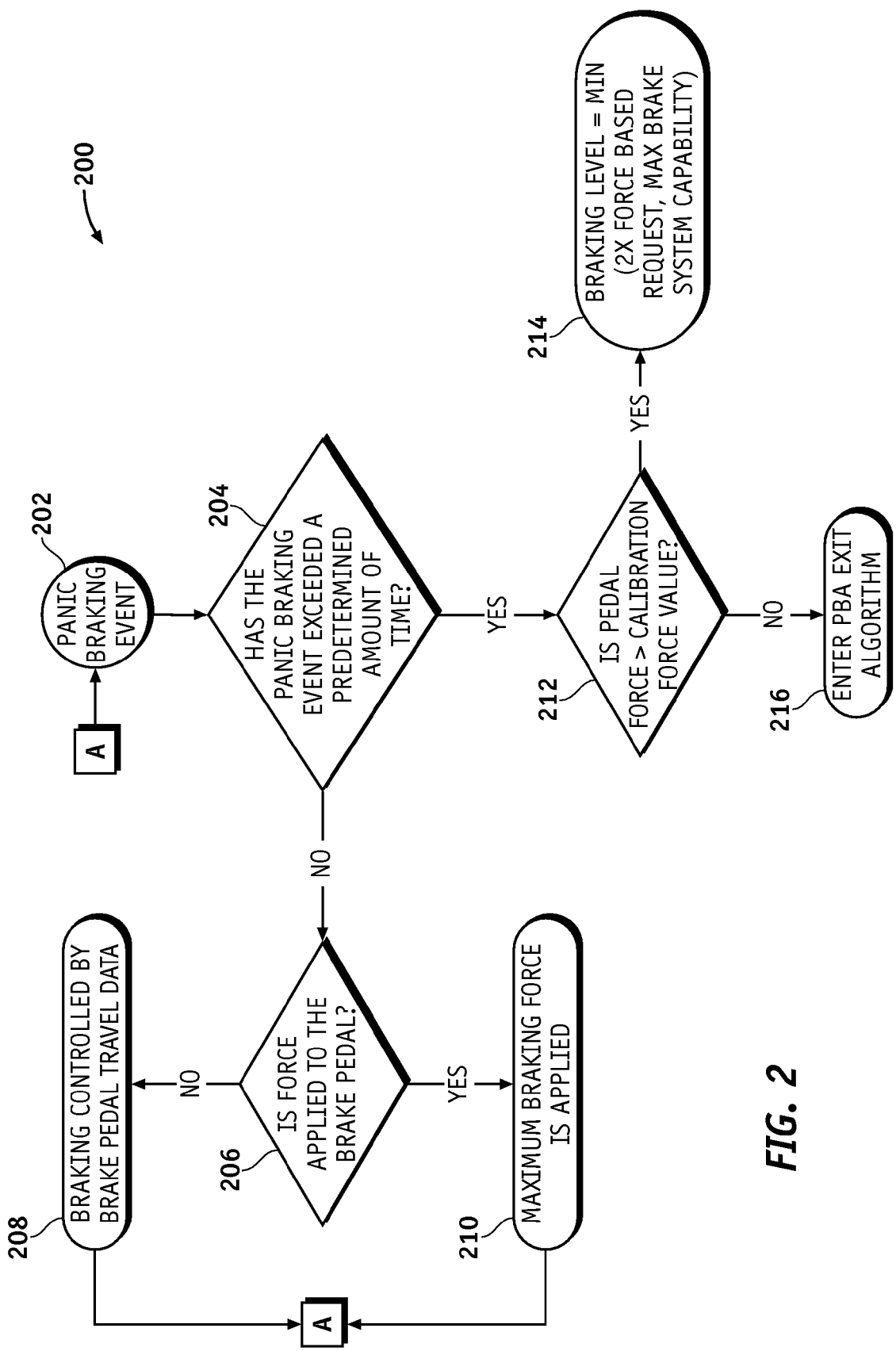
FIG. 2 is a flowchart illustrating a process for controlling a braking system, such as the braking system of FIG. 1, during a panic braking event.

FIG. 2 is a flowchart illustrating an exemplary embodiment of a process 200 for controlling braking during a panic braking event. The process 200 is preferably implemented with a number of consecutive loops over a period of time during vehicle operation. At any particular point in time, an ongoing loop is referred to as the present loop. There may be any number of prior loops and subsequent loops occurring before and after the present loop, respectively.

The process commences with a detection that a panic braking event is occurring (step 202). The detection of the panic braking event can be conducted in various manners, for example using one or more of the first, second, and third inputs 114, 116, and 118 from the brake pedal travel sensor 104, the brake pedal force sensor 106, and the brake pedal application sensor 108, respectively, of FIG. 1. If a panic braking event is detected, a determination is made as to whether the panic braking event has been detected for at least a predetermined amount of time, preferably as calculated using a calibration timer over a number of loops (step 204). For example, in one embodiment, the predetermined amount of time can be equal to the amount of time that it takes to perform a predetermined number of loops of the process. Alternatively, a delay may be utilized in step 204 in making an appropriate determination as to whether the panic braking event has been detected for at least the predetermined amount of time. These calculations, as well as the various other calculations, comparisons, and determinations referenced herein, are preferably conducted by the brake controller 110, and most preferably by a processor 120 therein or used in connection thereof, such as that described above in connection with FIG. 1.

If it is determined in step 204 that the panic braking event has not been detected for at least the predetermined amount of time, then the process proceeds to step 206, in which a determination is made as to whether force is being applied to the brake pedal—otherwise, the process proceeds instead to step 212, as described further below. For example, step 206 may be conducted by checking whether a brake light switch associated with the brake pedal application sensor 108 from FIG. 1 is activated.

If it is determined in step 206 that force is not being applied to the brake pedal, then the process proceeds to step 208. In step 208, the braking is controlled based on brake pedal travel data, such as the first input 114 from the brake pedal travel sensor 104 of FIG. 1, representing a measured travel distance, or how far the brake pedal 102 of FIG. 1 has been moved. Preferably, under these conditions, in step 208 a determination is made as to a level of braking that would correspond with the measured travel distance if this were not a panic braking situation, and a driver brake request is set equal to this amount. Accordingly, if the driver of the vehicle is not currently applying force to the brake pedal 102, the brake request is sent to the brake units 112 causing the brake units 112 to apply braking based solely on the brake pedal travel data. The process then repeats with a new iteration, beginning with step 202.

Conversely, if it is determined in step 206 that force is being applied to the brake pedal, then the process proceeds to step 210. In step 210, a maximum braking force is applied. For example, with respect to the exemplary braking system 100 of FIG. 1, the hydraulic boost valve 113 is opened completely, to thereby allow for the maximum braking force of the braking system 100. The process then repeats with a new iteration, beginning with step 202, and the maximum braking force is preferably continuously applied throughout each subsequent iteration until a predetermined amount of time has elapsed. In one embodiment, the predetermined amount of time reflects an amount of time that it is likely to take for the process to obtain an accurate measure of the driver's intended braking torque. For example, the predetermined amount of time is in the range of 210 to 230 milliseconds in one embodiment. The maximum braking force is continuously applied until it is determined in step 204 that the panic braking event has been detected for at least the predetermined amount of time.

Once it is determined in step 204 that the panic braking event has been detected for at least the predetermined amount of time, the process proceeds to step 212. In step 212, brake pedal force data is analyzed to determine a measured amount of force applied to the brake pedal, and a determination is made as to whether the measured amount of force applied to the brake pedal is greater than a predetermined calibration force value. In a preferred embodiment with respect to the exemplary braking system 100 of FIG. 1, the brake pedal force data is obtained via the brake pedal force sensor 106. However, it will be appreciated that other devices may be used. The predetermined calibration force value represents a minimum value of brake pedal force associated with a panic braking event, such that if the brake pedal force is below the predetermined calibration force value, it is desirable to initiate an exit from the panic braking assist algorithm. The predetermined calibration force value may be determined through experimental data, literature in the field, and/or other sources, and may vary depending on the type of vehicle involved and the type of braking system installed therein.

If it is determined in step 212 that the measured amount of force applied to the brake pedal is greater than the predetermined calibration force value, then the process proceeds to step 214, in which the braking system is applied with a level of braking based solely on the measured amount of force applied to the brake pedal. Specifically, in step 214, a determination is made as to a level of braking that would result from the magnitude of force applied to the brake pedal if there were no panic braking event, and the braking system is applied with a level of braking equal to the lesser of the following: (i) the maximum braking capacity (e.g. of the braking system 100 of FIG. 1), and (ii) the level of braking that would result from the magnitude of force applied to the brake pedal if there were no panic braking event, multiplied by a predetermined constant. Conversely, if it is determined in step 212 that the measured amount of force applied to the brake pedal is less than or equal to the predetermined calibration force value, then the process proceeds instead to step 216, in which the process enters a non-depicted exit algorithm, and/or takes other appropriate measures to phase-out or otherwise terminate the application of the braking system with the levels of braking set forth in step 214.

The determination of the level of braking that would result from the magnitude of force applied to the brake pedal if there were no panic braking event is preferably made via a pedal force-to-brake torque lookup table. The maximum amount of force, if applied, preferably is done so using the hydraulic boost valve 113 discussed above. In a preferred embodiment the predetermined constant is equal to two, for example, to meet new guidelines proposed by the European Union requiring panic braking assist algorithms and systems to provide braking torque that is at least double the braking torque that would ordinarily be represented by the driver's brake request. However, the predetermined constant may vary in different embodiments and implementations.

Thus, in a preferred embodiment, upon detecting a valid panic braking event (step 202 of FIG. 2) in which the driver's foot is on the brake pedal (step 206), the process 200 immediately applies maximum braking force (step 210) for a predetermined amount of time, without the lag time associated with many panic braking control algorithms. Following the predetermined amount of time, braking is applied with a level equal to the lesser of the following: (i) the maximum braking capacity of the braking system 100 of FIG. 1, and (ii) double the level of braking that would result from the magnitude of force applied to the brake pedal 102 of FIG. 1, if there were no panic braking event (step 214). By applying the brake system with a level of braking that varies directly with the amount of force applied to the brake pedal 102 of FIG. 1 in this manner, the driver is provided a level of control over braking, even during the panic braking event. In addition, the process 200 utilizes brake pedal travel data instead to determine the level of braking if the driver completely removes his or her foot from the brake pedal 102 of FIG. 1 (step 208), and transitions to an exit from the panic braking assist levels of braking if the driver eases up on the brake pedal 102 to a sufficient extent (step 216).

Figure 3:
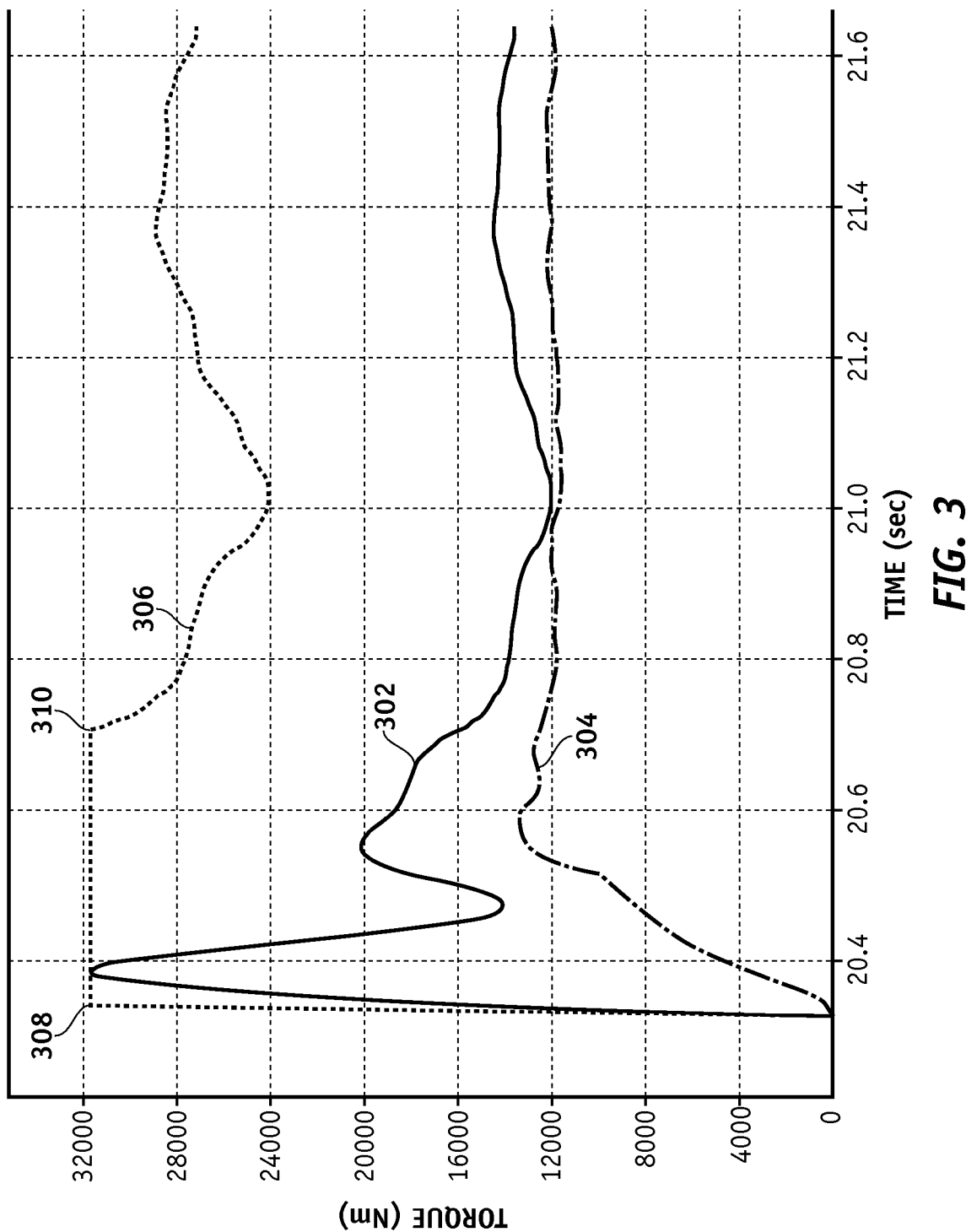
FIG. 3 is a graphical representation of an exemplary episode in which a driver of a vehicle has applied force to a brake pedal of the vehicle braking system of FIG. 1 and in which the process of FIG. 2 has been applied.

FIG. 3 is a graphical representation of an exemplary episode in which a driver of a vehicle has applied force to the brake pedal 102 of the braking system 100 of FIG. 1 and in which the process 200 of FIG. 2 has been applied. Specifically, FIG. 3 includes a force-based driver request curve 302 (based on brake force data obtained by the brake pedal force sensor 106 of FIG. 1, in a preferred embodiment), a travel-based driver request curve 304 (based on brake travel data obtained by the brake pedal travel sensor 104 of FIG. 1, in a preferred embodiment), and a braking system application level curve 306 (based on the level of application of the braking system as determined in the process 200 of FIG. 2), each depicting respective values for one particular application of the process 200 in practice using simulated empirical data. The x-axis represents time (measured in sec), and the y-axis measures torque (measured in Newton-meters).

As shown in FIG. 3, the driver has placed a foot on the brake pedal prior to point 308, at which point the brake units 112 are immediately applied at a maximum level, as shown by the braking system application level curve 306 being equal to the maximum level (corresponding to step 206 of FIG. 2). The brake units 112 of FIG. 1 are maintained for a predetermined amount of time, between points 308 and 310. Point 310 is reached upon completion of the predetermined amount of time (corresponding to step 204 of FIG. 2) or as soon thereafter that the braking level that would correspond with the braking force data if this were not a panic braking event is less than one-half the maximum level (corresponding to step 214 of FIG. 2). Beginning at point 310, the brake units 112 are applied at a level equal to double the level of braking that would correspond with the braking force data if this were not a panic braking event (also corresponding to step 214 of FIG. 2). The braking level thereafter fluctuates in a direct relationship with the brake pedal force data, symbolized by the braking system application level curve 306 remaining at a height twice that of the force-based driver request curve 302, so long as these conditions continue to be met (i.e., so long as the panic braking event continues, the driver is still applying force to the brake pedal, and the force applied to the brake pedal is greater than the predetermined calibration value).

Accordingly, braking systems and processes for controlling braking during a panic braking event have been described. The braking systems and processes provide a vehicle operator with more braking control during a panic braking event without significant lag time, for example because signal filtering is not required throughout the system. Instead, the braking system 100 and the process 200 provide immediate application of an appropriate increased braking level. In addition, the braking system 100 and the process 200 allow the driver of the vehicle to exercise more control over the braking system, even during a panic braking event, by selectively altering the force applied to the brake pedal. The braking system 100 and the process 200 can also more meet future governmental regulations, such as the above-mentioned proposed European regulations requiring panic braking assist algorithms and systems to provide braking torque that is at least double the braking torque that would ordinarily be represented by the driver's brake request.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a braking system in a vehicle during a panic braking event, the braking system having a brake pedal and a maximum braking capacity, the method comprising the steps of:
   determining a magnitude of force applied to the brake pedal;
   determining a first level of braking torque associated with the magnitude of force applied to the brake pedal; and
   applying a second level of braking torque during the panic braking event, the second level of braking torque being equal to the lesser of the following:
   the maximum braking capacity; and
   the first level of braking torque, multiplied by a predetermined constant that is greater than one.

2. The method of claim 1, further comprising the step of:
   determining whether the magnitude of force applied to the brake pedal is greater than a predetermined value;
   wherein the second level of braking torque is applied only if the magnitude of force applied to the brake pedal is greater than the predetermined value.

3. The method of claim 1, wherein the predetermined constant is approximately equal to two.

4. The method of claim 1, further comprising the step of:
   applying a level of braking torque equal to the maximum braking capacity for a predetermined amount of time following detection of the panic braking event;
   wherein the braking system is applied with the second level of braking torque only after the predetermined amount of time.

5. The method of claim 4, further comprising the steps of:
   determining a measure of brake pedal movement;
   determining whether the brake pedal is applied by a driver;
   determining a third level of braking torque associated with the measure of brake pedal movement; and
   applying the third level of braking torque, if it is determined that the brake pedal is not applied by the driver.

6. The method of claim 4, wherein the predetermined amount of time is within the range of 210 to 230 milliseconds.

7. A control system for controlling a braking system in a vehicle during a panic braking event, the braking system having a brake pedal and a maximum braking capacity, the control system comprising:
a sensor configured to at least facilitate measuring a force applied to the brake pedal; and
a processor configured to at least facilitate:
determining a first level of braking torque associated with the force applied to the brake pedal; and
applying a second level of braking torque during the panic braking event, the second level of braking torque being equal to the lesser of the following:
the maximum braking capacity; and
the first level of braking torque, multiplied by a predetermined constant that is greater than one.

8. The control system of claim 7, wherein the processor is further configured to at least facilitate:
determining whether the force applied to the brake pedal is greater than a predetermined value; and
applying the second level of braking only if the force applied to the brake pedal is greater than the predetermined value.

9. The control system of claim 8, wherein the processor is further configured to at least facilitate:
applying a level of braking torque equal to the maximum braking capacity for a predetermined amount of time following detection of the panic braking event; and
applying the second level of braking torque only after the predetermined amount of time.

10. The control system of claim 8, further comprising:
a second sensor configured to at least facilitate measuring brake pedal movement; and
a third sensor configured to at least facilitate determining whether the brake pedal is applied by a driver;
wherein the processor is further configured to at least facilitate:
determining a third level of braking torque associated with the brake pedal movement; and
applying the third level of braking torque, if it is determined that the brake pedal is not applied by the driver.

11. The control system of claim 8, further comprising:
a memory configured to store values of the force applied to the brake pedal.

12. A braking system for a vehicle having a maximum braking capacity, comprising:
a brake pedal;
a brake pedal force sensor configured to generate force data indicative of a magnitude of force applied to the brake pedal;
a plurality of brake units configured to slow or stop the vehicle; and
a brake controller for controlling the plurality of brake units in the vehicle during a panic braking event, the brake controller configured to at least facilitate:
determining a first level of braking torque associated with the magnitude of force applied to the brake pedal; and
applying the plurality of brake units with a second level of braking during the panic braking event, the second level of braking being equal to the lesser of the following:
the maximum braking capacity; and
the first level of braking torque, multiplied by a predetermined constant that is greater than one.

13. The braking system of claim 12, wherein the brake controller is further configured to at least facilitate:
determining whether the magnitude of force applied to the brake pedal is greater than a predetermined value; and
applying the plurality of brake units with the second level of braking torque only if the magnitude of force applied to the brake pedal is greater than the predetermined value.

14. The braking system of claim 13, wherein the braking controller is further configured to at least facilitate:
applying the plurality of brake units with a level of braking torque equal to the maximum braking capacity for a predetermined amount of time following detection of the panic braking event; and
applying the plurality of brake units with the second level of braking torque only after the predetermined amount of time.

15. The method of claim 1, wherein the predetermined constant is approximately equal to two.

16. The braking system of claim 13, further comprising:
a second sensor configured to at least facilitate determining a measure of brake pedal movement; and
a third sensor configured to at least facilitate determining whether the brake pedal is applied by a driver;
wherein the brake controller is further configured to at least facilitate:
determining a third level of braking torque associated with the measure of brake pedal movement; and
applying the plurality of brake units with the third level of braking torque, if it is determined that the brake pedal is not applied by the driver.

17. The braking system of claim 13, further comprising:
a brake light switch;
wherein the third sensor is configured to at least facilitate determining whether the brake light switch is activated.

18. The braking system of claim 13, further comprising:
a hydraulic boost valve configured to at least facilitate application of the plurality of brake units with a level of braking torque equal to the maximum braking capacity for a predetermined amount of time following detection of the panic braking event.

19. The braking system of claim 13, wherein the brake pedal force sensor comprises a hydraulic brake pedal emulator.

20. The braking system of claim 13, wherein the predetermined amount of time is within the range of 210 to 230 milliseconds.

* * * * *